(12) United States Patent
Kim et al.

(10) Patent No.: US 9,219,385 B2
(45) Date of Patent: Dec. 22, 2015

(54) COOPERATIVE WIRELESS POWER SIGNAL TRANSMISSION METHOD AND DEVICE

(75) Inventors: Byoung Hoon Kim, Anyang-si (KR); Jun Ho Jo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 881 days.

(21) Appl. No.: 13/392,466

(22) PCT Filed: Aug. 24, 2010

(86) PCT No.: PCT/KR2010/005624
§ 371 (c)(1),
(2), (4) Date: May 7, 2012

(87) PCT Pub. No.: WO2011/025212
PCT Pub. Date: Mar. 3, 2011

(65) Prior Publication Data
US 2012/0214536 A1    Aug. 23, 2012

Related U.S. Application Data

(60) Provisional application No. 61/237,302, filed on Aug. 27, 2009.

(51) Int. Cl.
*H04B 1/00* (2006.01)
*H04B 7/00* (2006.01)
*H02J 17/00* (2006.01)
*H02J 7/02* (2006.01)

(52) U.S. Cl.
CPC . *H02J 17/00* (2013.01); *H02J 7/025* (2013.01)

(58) Field of Classification Search
CPC ...................................................... H04W 52/00
USPC ................................. 455/571, 572, 573, 574
See application file for complete search history.

(56) References Cited

U.S. PATENT DOCUMENTS

| 4,088,999 A | 5/1978 | Fletcher et al. |
| 5,982,139 A | 11/1999 | Parise |
| 6,301,514 B1 * | 10/2001 | Canada et al. ................. 700/108 |
| 8,134,958 B2 * | 3/2012 | Kokku et al. ................. 370/328 |
| 2008/0171512 A1 | 7/2008 | Jack et al. |
| 2009/0003022 A1 * | 1/2009 | Nunoya et al. ................... 363/78 |

(Continued)

FOREIGN PATENT DOCUMENTS

WO    WO 2009/077195 A1    6/2009

OTHER PUBLICATIONS

Shinohara et al., "Experimental Study of Large Rectenna Array for Microwave Energy Transmission," IEEE Transactions on Microwave Theory and Techniques, vol. 46, No. 3, Mar. 1998, pp. 261-268.

*Primary Examiner* — Tilahun B Gesesse
(74) *Attorney, Agent, or Firm* — Birch, Stewart, Kolasch & Birch, LLP

(57) ABSTRACT

Disclosed are a method and device for cooperatively sending and receiving power wirelessly. Wireless power charging coverage at the level of data signal transmission can be ensured by establishing one or more modes for transmitting, to a specific terminal, a power transmission signal from any of a plurality of nodes which is (are) not engaged in data transmission, and by matching the phase synchronization of the power transmission signal between the one or more nodes and then transmitting, to the specific terminal, a power transmission signal of which the phase synchronization has been matched by means of the one or more modes.

17 Claims, 7 Drawing Sheets

(56) References Cited

U.S. PATENT DOCUMENTS

| | | |
|---|---|---|
| 2009/0160261 A1 | 6/2009 | Elo |
| 2009/0312046 A1* | 12/2009 | Clevenger et al. ............ 455/522 |
| 2011/0216658 A1* | 9/2011 | Etkin et al. .................... 370/242 |
| 2012/0320833 A1* | 12/2012 | Yamamoto et al. ........... 370/328 |

\* cited by examiner

COOPERATIVE WIRELESS POWER SIGNAL TRANSMISSION METHOD AND DEVICE

CROSS REFERENCE TO RELATED APPLICATIONS

This application is the National Phase of PCT/KR2010/005624 filed on Aug. 24, 2010, which claims priority under 35 U.S.C. 119(e) to U.S. Provisional Application No. 61/237,302 filed on Aug. 27, 2009, all of which are hereby expressly incorporated by reference into the present application.

TECHNICAL FIELD

The present invention relates to a method and device for cooperatively sending and receiving power wirelessly

BACKGROUND ART

In general, in order to charge a terminal device, such as a mobile phone, a notebook, etc., the terminal device needs to be directly connected to a charger, or be connected to the charger through a USB charging cable.

The above-described wired charging method restricts a scope of application of the portable terminal device, and thus a requirement for technology allowing a user to charge a terminal wirelessly at any place is being increased according to recent development of information communication devices, such as smart phones, etc.

FIG. 1 is a view illustrating the concept of general wireless charging.

As shown in FIG. 1, a general wireless charging system may include an electromagnetic generator 200 and a terminal 100.

The electromagnetic generator 200 generates radio waves allowing the terminal 100 to generate induced current. The terminal 100 having received such radio waves may include an induced current generation unit to generate induced current through the received radio waves and a battery charging unit. Such an induced current generation unit may generate induced current using the radio waves generated from the electromagnetic generator 200, and charge a battery through the induced current.

However, the above-described basic concept of wireless charging relates to a case in which the electromagnetic generator 200 is operated as a device generating only radio waves for wireless charging. Therefore, investigation of a more flexible wireless charging method using general base stations (e.g., macro BSs) as well as access points (APs), Femto base stations (BSs), relay stations and wireless personal area networks (WPANs) is required.

DISCLOSURE

Technical Problem

An object of the present invention is to provide a method of effectively executing wireless charging of a terminal using nodes (APs, Femto BSs, relay stations, WPANs, macro BSs, etc.) transmitting data to the terminal in a wireless communication system, and a device for executing the same.

Technical Solution

The object of the present invention can be achieved by providing a wireless power transmission method in which power is wirelessly transmitted to terminals in a wireless communication system, including determining one or more nodes to transmit power transmission signals to a specific terminal, from among a plurality of nodes, matching phase synchronization of the power transmission signals between the one or more nodes with each other, and allowing the one or more nodes to transmit the power transmission signals of which the phase synchronization has been matched to the specific terminal.

The plurality of nodes may include one or more of access points (APs), Femto base stations (BSs), relay stations, wireless personal area networks (WPANs) and macro BSs to transmit the power transmission signals and data to the specific terminal.

The wireless power transmission method may further include allowing one or more nodes from among the plurality of nodes to receive a request signal requesting the power transmission signals from the specific terminal. In this case, the one or more nodes from among the plurality of nodes may transmit the power transmission signals to the specific terminal according to priority of the request signal.

The one or more nodes may transmit the power transmission signals of which the phase synchronization has been matched for a period when the specific terminal is in an idle mode. In this case, the one or more nodes from among the plurality of nodes and the specific terminal may exchange information regarding switching time of at least one mode from among a sleep mode, the idle mode and an active mode of the specific terminal.

The wireless communication system may execute communication using a frame structure including a first time section for transmission of the power transmission signals and a second time section for transmission of signals other than the power transmission signals. In this case, the second time section may include a time section for uplink signal reception and a time section for downlink signal transmission.

The wireless communication system may execute communication using a frame structure including a sub-band for transmission of the power transmission signals, from among a downlink bandwidth.

In order to solve the above problems, a wireless power transmission method in which terminals wirelessly receive power in a wireless communication system, include receiving power transmission signals of which the phase synchronization has been matched from one or more nodes determined from among a plurality of nodes, and executing wireless charging using the power transmission signals.

The plurality of nodes may include one or more of access points (APs), Femto base stations (BSs), relay stations, wireless personal area networks (WPANs) and macro BSs to transmit the power transmission signals and data to a specific terminal.

The wireless power transmission method may further include allowing a specific terminal to transmit a request signal requesting the power transmission signals to one or more nodes from among the plurality of nodes.

The specific terminal may receive the power transmission signals of which the phase synchronization has been matched from the one or more nodes for a period when a specific terminal is in an idle mode. In this case, the one or more nodes from among the plurality of nodes and the specific terminal may exchange information regarding switching time of at least one mode from among a sleep mode, the idle mode and an active mode of the specific terminal.

The wireless communication system may execute communication using a frame structure including a first time section for transmission of the power transmission signals and a second time section for transmission of signals other than the power transmission signals. In this case, the second time section includes a time section for uplink signal transmission and a time section for downlink signal reception. Otherwise, the wireless communication system may execute communication using a frame structure including a sub-band for transmission of the power transmission signals, from among a downlink bandwidth.

In order to solve the above problems, a wireless power transmission device which wirelessly transmits power to terminals in a wireless communication system, includes a processor to determine one or more wireless power transmission devices to transmit power transmission signals to a specific terminal between wireless power transmission devices, and to match phase synchronization of the power transmission signals between the one or more wireless power transmission devices with each other, and a transmission module to transmit the power transmission signals of which the phase synchronization has been matched between the one or more wireless power transmission devices to the specific terminal.

In order to solve the above problems, a terminal device which wirelessly receives power in a wireless communication system to execute charging, includes a reception module to receive power transmission signals of which the phase synchronization has been matched from one or more nodes determined from among a plurality of nodes, and a charging module to execute wireless charging using the power transmission signals.

Advantageous Effects

According to the embodiments of the present invention, a terminal may effectively execute wireless charging using nodes (APs, Femto BSs, relay stations, WPANs, macro BSs, etc.) transmitting data to the terminal in a wireless communication system.

BEST MODE

Reference will now be made in detail to the preferred embodiments of the present invention, examples of which are illustrated in the accompanying drawings. The detailed description which will be disclosed with reference to the accompanying drawings is to describe exemplary embodiments, but is not to represent one embodiment to implement the present invention.

The detailed description includes particulars to provide complete understanding of the present invention. However, it will be apparent to those skilled in the art that the present invention can be implemented without these particulars. In some cases, in order to avoid obscurity of the present invention, known structures and devices may be omitted, or may be illustrated in a block diagram form showing essential functions of respective structures and devices. Wherever possible, the same reference numbers will be used throughout the drawings to refer to the same or like parts.

Hereinafter, a method of effectively executing wireless charging of a terminal using nodes (APs, Femto BSs, relay stations, WPANs, macro BSs, etc.) transmitting data to the terminal in a wireless communication system, and a device for executing the same will be described. In the description which will be given hereinafter, it is assumed that, even if the above-described nodes are separated from the terminal by a distance by which the nodes may transmit data to the terminal, the terminal may effectively execute wireless charging through wireless charging signals. The reason for this is that a plurality of nodes supporting wireless charging is present around terminals executing wireless charging and the plural nodes cooperatively transmit wireless charging signals to a specific terminal.

Figure 1:
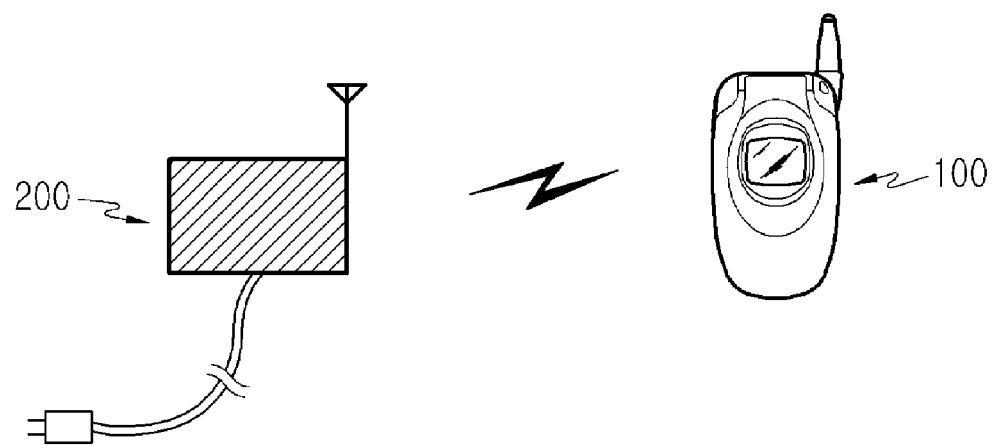
FIG. 1 is a view illustrating the concept of general wireless charging.
Figure 2:
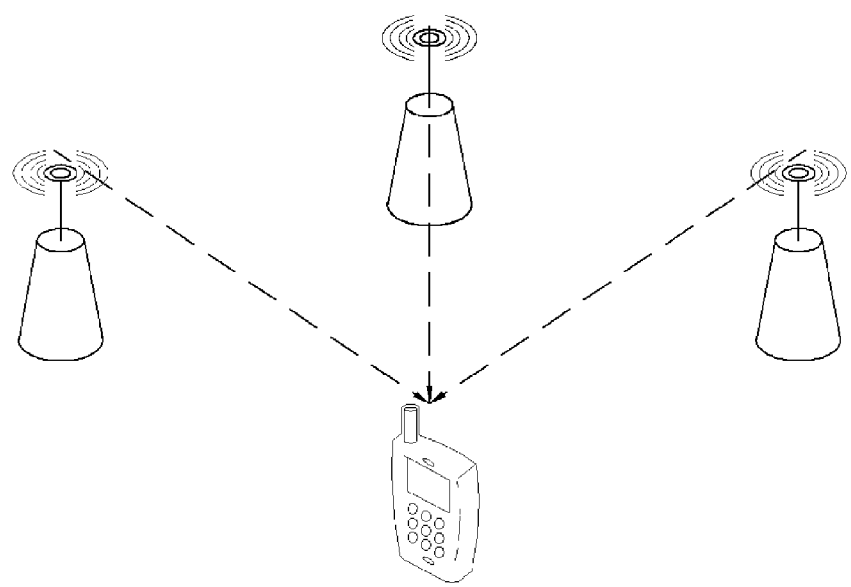
FIG. 2 is a view illustrating the concept of cooperative wireless charging in accordance with one embodiment of the present invention.

FIG. 2 is a view illustrating the concept of cooperative wireless charging in accordance with one embodiment of the present invention.

As shown in FIG. 2, the embodiment of the present invention proposes that a plurality of nodes cooperatively transmits wireless charging signals or wireless power transmission signals to a specific terminal to obtain a wireless power transmission distance in proportion to a data transmission distance of the nodes. Here, all of the plural nodes may be engaged in transmission of the wireless power transmission signals to the specific terminal, or (a) specific node(s) may execute data transmission and one or more predetermined nodes from among the nodes not executing data transmission may transmit wireless power transmission signals to the terminal. Here, various waveforms may be considered as the wireless power transmission signal transmitted to the specific terminal from the plural nodes.

It may be assumed that a sine wave or a single tone is used as the simplest type of the wireless power transmission signal. Further, a specific waveform which has been appointed in advance between the terminal and nodes having a wireless charging function may be used as the wireless power transmission signal. That is, as a waveform which has been appointed in advance according to characteristics of a channel, a signal waveform reflecting characteristics of the channel, such as a coherent time, multi-path fading, etc., may be designed. Such a designed signal waveform may be appointed between communication objects using the channel and be used, and a process of transmitting and receiving such information may be signaled.

The above wireless power transmission signal may be a waveform which has been appointed in advance according to characteristics of a communication method. For example, if communication is carried out through a pulse signal as in ultra wide band (UWB) communication or if communication is carried out by dividing a band into several sub-bands as in orthogonal frequency divisional multiplexing (OFDM), a signal waveform reflecting characteristics of a communication method may be designed. Communication objects may transmit and receive such a designed signal waveform in advance through signaling.

As the above wireless power transmission signal, a waveform of data transmitted and received by other devices may be also used.

When a specific AP transmits data, APs around the specific AP may transmit the data in cooperation with the specific AP to increase diversity of a receiving terminal, and other terminals rather than the receiving terminal may receive such a signal to receive power.

Hereinafter, phase synchronization matching to achieve the above-described cooperative wireless power signal transmission in accordance with the embodiment of the present invention will be described.

Figure 3:
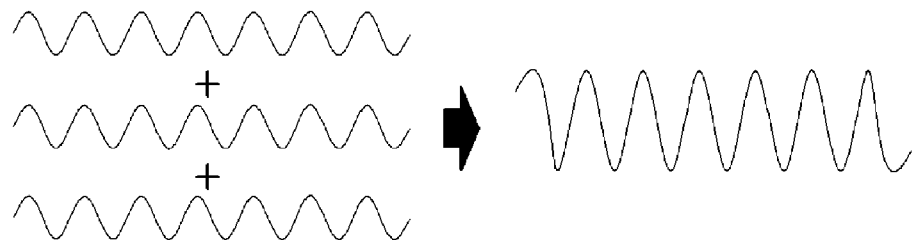
FIG. 3 is a view illustrating the concept of matching phase synchronization to cooperatively transmit wireless power transmission signals in accordance with the embodiment of the present invention.

FIG. 3 is a view illustrating the concept of matching phase synchronization to cooperatively transmit wireless power signals in accordance with the embodiment of the present invention.

As described above, in this embodiment, it is assumed that a plurality of nodes providing the wireless charging function is present around a terminal providing the wireless charging function. Although FIG. 3 illustrates a wireless power signal as being a sine wave for convenience of description, the wireless power signal may be designed in various forms, as described above.

A preferred embodiment of the present invention proposes that a terminal receives an amplified wireless power signal by matching phase synchronization between nodes engaged in wireless power signal transmission from among the plural nodes, as shown in FIG. 3. That is, if phases of the wireless power signals transmitted from the plural nodes coincide with each other, constructive interference occurs and thus an amplified wireless power signal is obtained, thereby being capable of improving coverage for wireless charging.

In order to match phase synchronization of the nodes engaged in wireless power transmission, as described above, the terminal may execute an operation of sequentially matching phase synchronization thereof with those of the nodes. Further, in accordance with another embodiment, in order to match phase synchronization of the nodes engaged in wireless power transmission, as described above, a specific node from among the plural nodes may match phase synchronization thereof with those of other nodes, and then transmit the wireless power transmission signal of which the phase synchronization has been matched to the terminal. Further, timing information signaling which will be described later, to match time when the nodes transmit wireless power signals to the terminal with time of a specific mode of the terminal may be required.

As described above, in the present invention, it is assumed that the above-described nodes providing the wireless charging function may execute general data communication as well as transmit the waveform for wireless charging. Thereby, the plural nodes may execute cooperation for data transmission and wireless charging therebetween on a time axis.

Figure 4:
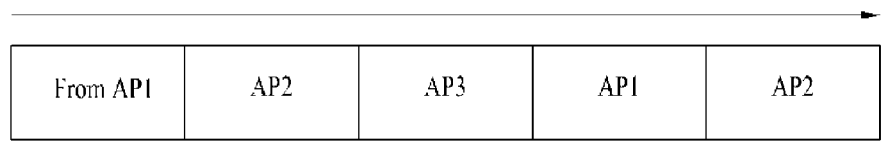
FIGS. 4 to 6 are views illustrating a method of executing cooperation between a plurality of nodes to transmit wireless power signals and data on a time axis to a terminal in accordance with the embodiment of the present invention.
Figure 5:
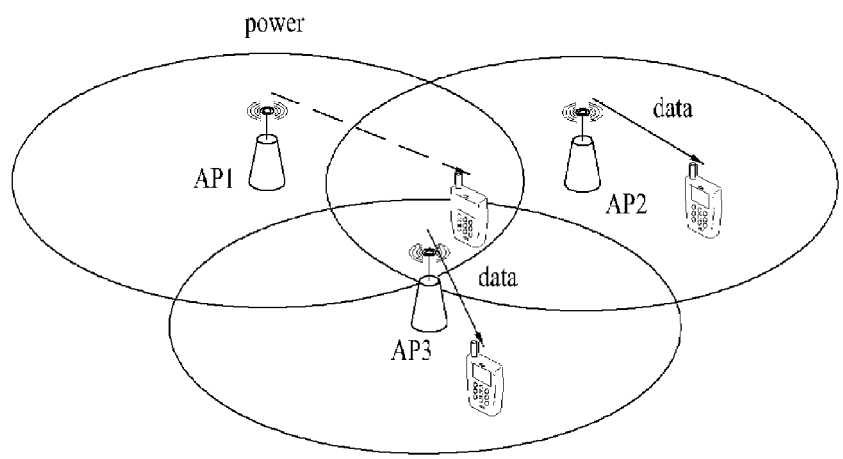
Figure 6:
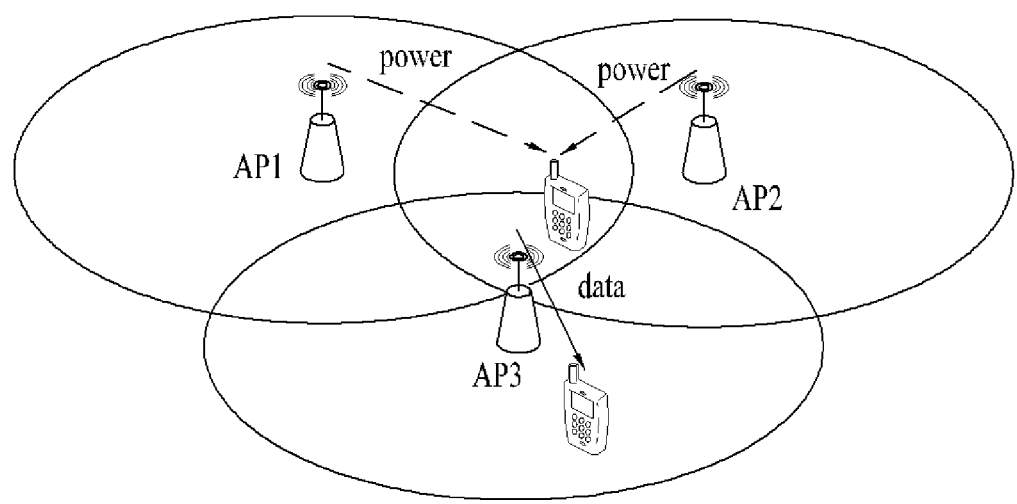

FIGS. 4 to 6 are views illustrating a method of executing cooperation between the plural nodes to transmit wireless power signals and data on the time axis to the terminal in accordance with the embodiment of the present invention.

First, it is assumed that, in FIGS. 4 to 6, nodes providing the wireless charging function are AP1 to AP3. In this embodiment, the terminal may continuously receive power signals from the plural APs for a continuous time, as shown in FIG. 4. That is, the plural APs around a terminal may sequentially transmit power signals to the terminal according to time. While a specific AP transmits power, the AP may provide a data service to a terminal under the region thereof, or some of several APs may transmit power and the remainder may transmit data. FIG. 5 illustrates a case in which, if the AP2 and the AP3 transmit data to terminals, the AP1 transmits wireless power to a terminal. Further, FIG. 6 illustrates a case in which, if the AP1 and the AP2 execute wireless power transmission, the AP3 provides a data service to a terminal within coverage thereof.

Further, the embodiment of the present invention proposes a method in which nodes providing the wireless power transmission function transmit wireless power signals according to a request of a terminal.

Figure 7:
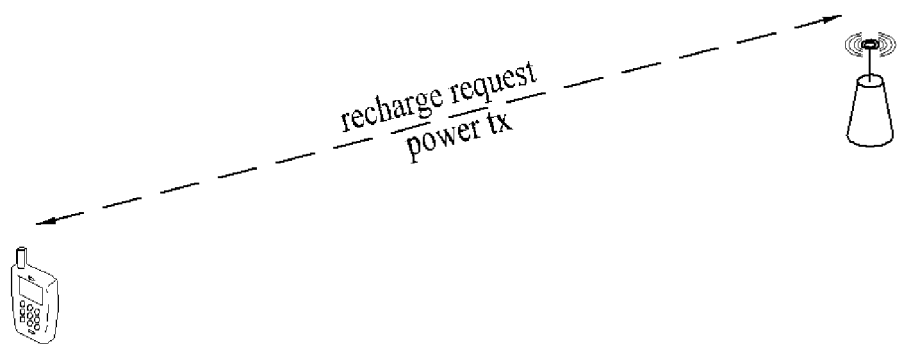
FIG. 7 is a view illustrating a method of receiving a wireless power transmission request of a terminal and then transmitting a wireless power signal in accordance with the embodiment of the present invention.

FIG. 7 is a view illustrating a method of receiving a wireless power transmission request of a terminal and then transmitting a wireless power signal in accordance with the embodiment of the present invention.

As shown in FIG. 7, the embodiment of the present invention proposes that a terminal confirms a battery state thereof and then transmits a signal requesting wireless power transmission to a plurality of nodes or a specific node from among the plurality of nodes. Such a wireless power transmission request signal may be included in a feedback signal of the terminal and be then transmitted, or may be transmitted in the form which is piggyback to data. If the terminal transmits the above-described wireless power transmission request signal in a feedback signal form, the wireless power transmission request signal may be cyclically transmitted in the same manner as feedback transmission, or may be transmitted only when necessary.

The node having received the wireless power transmission request signal may process the request according to priority of the corresponding request signal. For example, if a terminal of a user having subscribed to a specific service requests wireless power transmission, the wireless power transmission request may be set to be preferentially processed over general requests. Further, priority of a request transmitted through a specific event may be set to be higher than cyclic requests. Further, priority of a request may be set according to a degree of power remaining in the battery of the terminal.

If a node receives a wireless power transmission request of high priority, the corresponding node may possess the corresponding request information in common with other nodes which can be engaged in wireless power transmission, and, for this purpose, may transmit the information including corresponding terminal identification information to these nodes. If a node receives a wireless power transmission request of low priority, the corresponding mode may execute wireless power transmission to the corresponding terminal using a resource remaining after transmission of power and data to other terminals.

As described above, in the present invention, it is assumed that the corresponding terminals/nodes may execute general data communication and transmit/receive wireless power signals, simultaneously. Therefore, if a terminal in general data communication receives the above-described wireless power signal during a period of an idle mode of the terminal, the terminal may more effectively execute communication.

Figure 8:
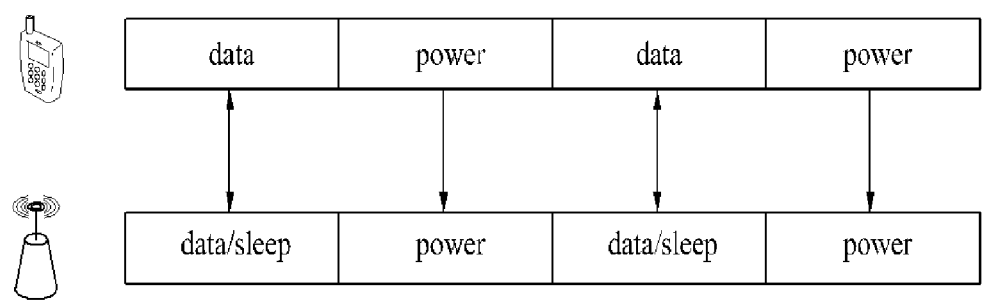
FIG. 8 is a view illustrating a method of matching an idle mode time of a terminal with a wireless power signal transmission time in accordance with the embodiment of the present invention.

FIG. 8 is a view illustrating a method of matching an idle mode time of a terminal with a wireless power signal transmission time in accordance with the embodiment of the present invention.

In a general communication system, a terminal may switch between a sleep mode, an idle mode and an active mode according to data exchange information with a base station or intermediate nodes. Since the operating time of the terminal in the idle mode from among the above modes is a period when data transmission and reception of the terminal with the intermediate nodes is minimized and power consumption is reduced, the embodiment of the present invention proposes that the operating time of the terminal in the idle mode coincides with a time of receiving a wireless power signal to obtain efficiency of communication. For this purpose, in this embodiment, signaling to match mode switch timing of the terminal and wireless power signal transmission timing of nodes executing the wireless charging function with each other may be executed.

If a terminal transmits the mode in a transmission cycle of a wireless power signal and data of a node executing the wireless charging function, for example, an AP, the terminal may be operated as follows. In the case of a terminal not requiring power reception, the terminal may be operated in the sleep mode according to the power/data cycle of the AP. In the case of a terminal requiring power reception, the terminal may repeat data and power reception according to the power/data cycle of the AP. If the power/data cycle of the AP is changed, the AP may execute signaling to the terminal such that the terminal matches the cycle thereof with the changed power/data cycle.

If the data/wireless power transmission cycle of the AP is predetermined, as shown in FIG. 8, the terminal may be set to receive wireless power in a wireless power transmission section and to be operated in the sleep mode or receives data in a data transmission section according to presence or absence of data to be received.

Further, the AP continuously broadcasts information regarding the cycle/power transmission time changed for a designated time, thereby allowing the terminal cyclically activated to receive such information and then to match a cycle thereof with the information. The above-described cycle information may be transmitted under the condition that the cycle information is included in system information transmitted through a broadcast channel or in general control channel/data channel.

Hereinafter, frame structures usable in a system providing the above-described wireless charging function will be described.

Figure 9:
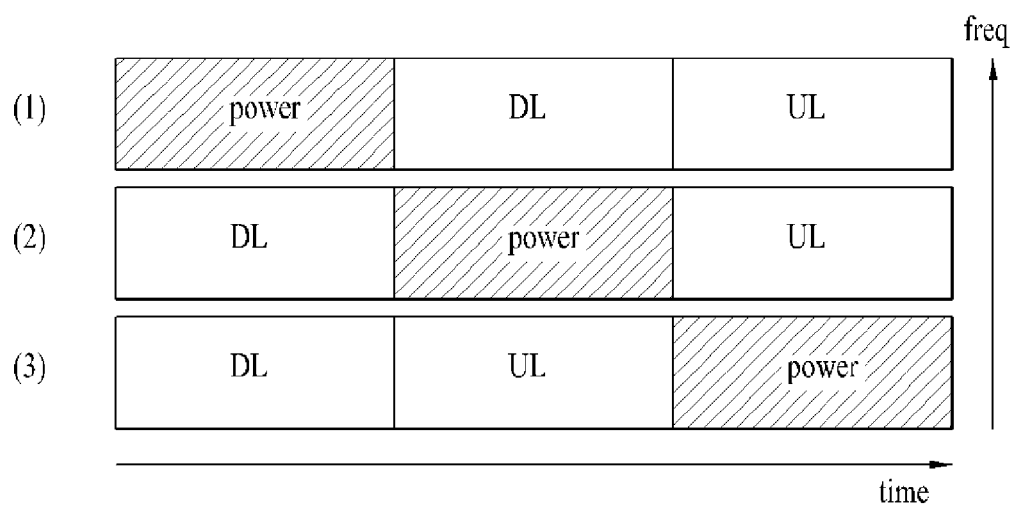
FIG. 9 is a view illustrating examples of frame structures in which a time region for wireless power transmission is separately set in accordance with the embodiment of the present invention.

FIG. 9 is a view illustrating examples of frame structures in which a time region for wireless power transmission is separately set in accordance with the embodiment of the present invention.

FIGS. 9(1) to 9(3) illustrate frame structures if the above-described wireless power transmission section is separately set in a system in which an uplink time section and a downlink time section are separately present, as in a time divisional duplexing (TDD) system. The time region for wireless power transmission may be located prior to the downlink/uplink sections, as shown in FIG. 9(1), be located between the downlink section and the uplink section, as shown in FIG. 9(2), or be located after the downlink/uplink sections, as shown in FIG. 9(3). That is, the wireless frame in the TDD system may be divided into three time sections.

FIG. 9 exemplarily illustrates the TDD system. However, in a frequency divisional duplexing (FDD) system, an uplink section and a downlink section are not divided from each other, and thus a frame structure of the FDD system may include two time regions, i.e., an uplink/downlink data transmission section and a wireless power transmission section.

Figure 10:
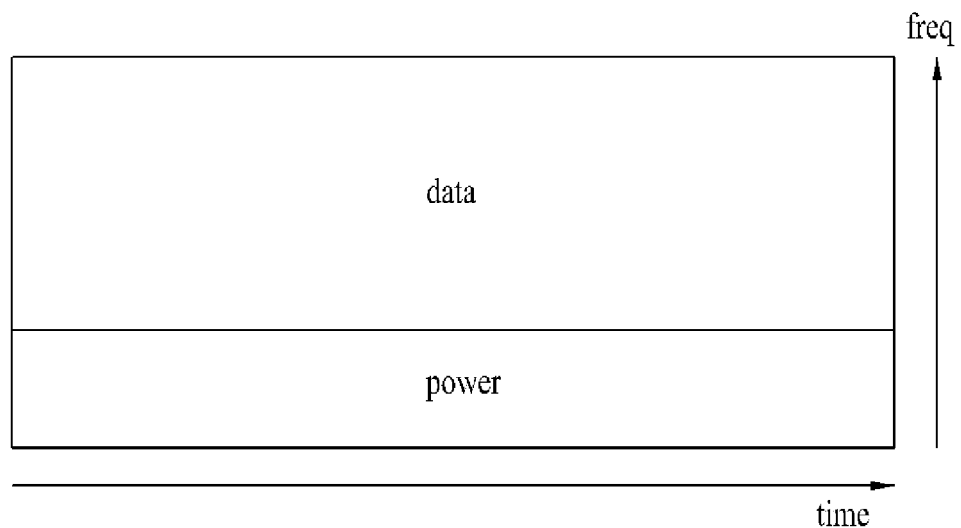
FIG. 10 is a view illustrating one example of a frame structure in which a frequency region for wireless power transmission is separately set in accordance with the embodiment of the present invention.

FIG. 10 is a view illustrating one example of a frame structure in which a frequency region for wireless power transmission is separately set in accordance with the embodiment of the present invention.

FIG. 10 illustrates transmission of the above-described wireless power transmission signal through a power transmission band allotted to a specific frequency sub-band. A terminal may charge the battery thereof through the wireless power transmission signal received through the above-designated sub-band.

Further, the embodiment of the present invention proposes use of a frame structure designed such that time region division and frequency region division shown in FIGS. 9 and 10 are combined. That is, nodes providing the wireless charging function may transmit wireless power signals to specific time/frequency regions, and terminals requiring power may receive charging signals through resource regions in which a channel state is good.

Hereinafter, a configuration of a device to execute the above-described cooperative wireless charging function will be described.

Figure 11:
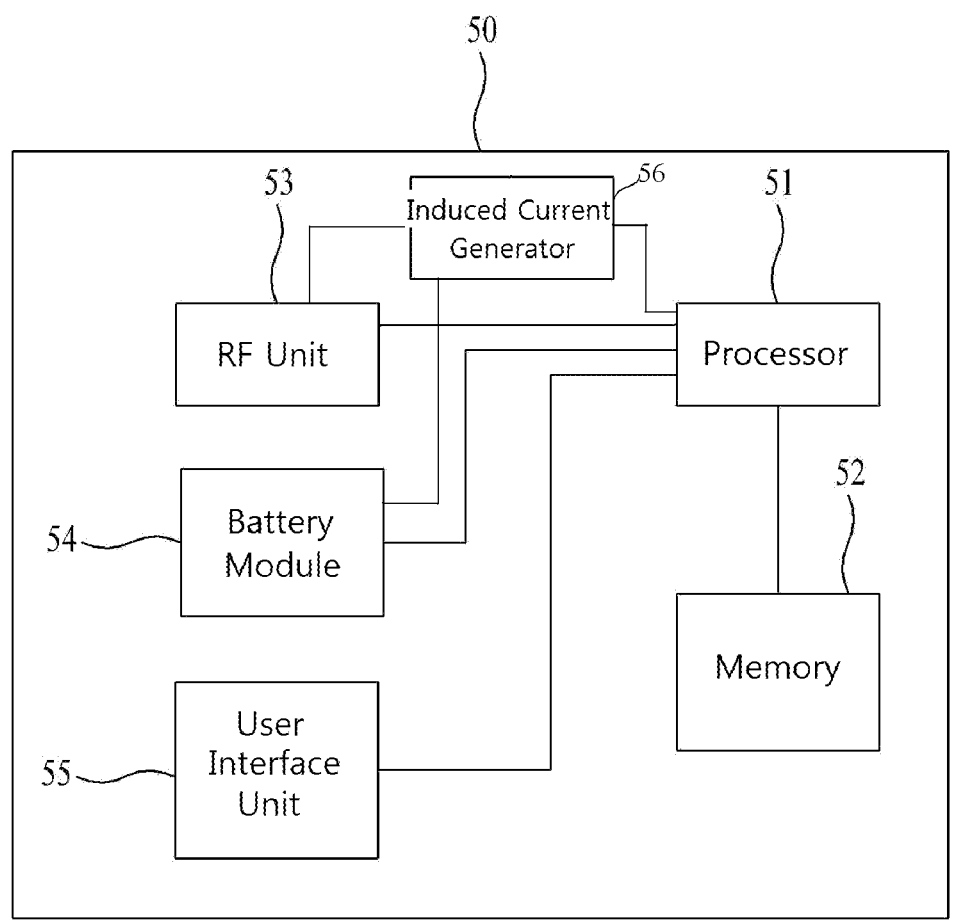
FIG. 11 is a view illustrating a configuration of a terminal device in accordance with one embodiment of the present invention.

FIG. 11 is a view illustrating a configuration of a terminal device in accordance with one embodiment of the present invention.

As shown in FIG. 11, the terminal device 50 in accordance with the embodiment of the present invention may include a processor 51, a memory 52, an RF unit 53, a battery module 54, a user interface unit 55 and an induced current generator 56.

In more detail, in FIG. 11, the RF unit 53 may be divided into a reception module (not shown) to receive signals from a plurality of nodes, and a transmission module (not shown) to transmit a signal to the plurality of nodes. The RF unit 53 of the terminal device 50 in accordance with this embodiment may include the reception module to receive power transmission signals of which the phase synchronization has been matched from one or more nodes not executing data transmission from among the plural nodes. Further, the terminal device 50 in accordance with this embodiment may include a charging module to execute wireless charging using the above-described power transmission signals, and FIG. 11 illustrates the induced current generator 56 as one example of the charging module. Induced current generated by the induced current generator 56 may be supplied to the battery module 54 of the terminal device 50, and thus charging may be executed. Such an operation may be controlled by the processor 51 of the terminal device 50. Further, the terminal device 50 in accordance with the embodiment of the present invention may request power transmission to the wireless charging nodes according to a wireless charging request signal directly input by a user through the interface unit 55. Moreover, the terminal device 50 may store information required by the memory 52.

Figure 12:
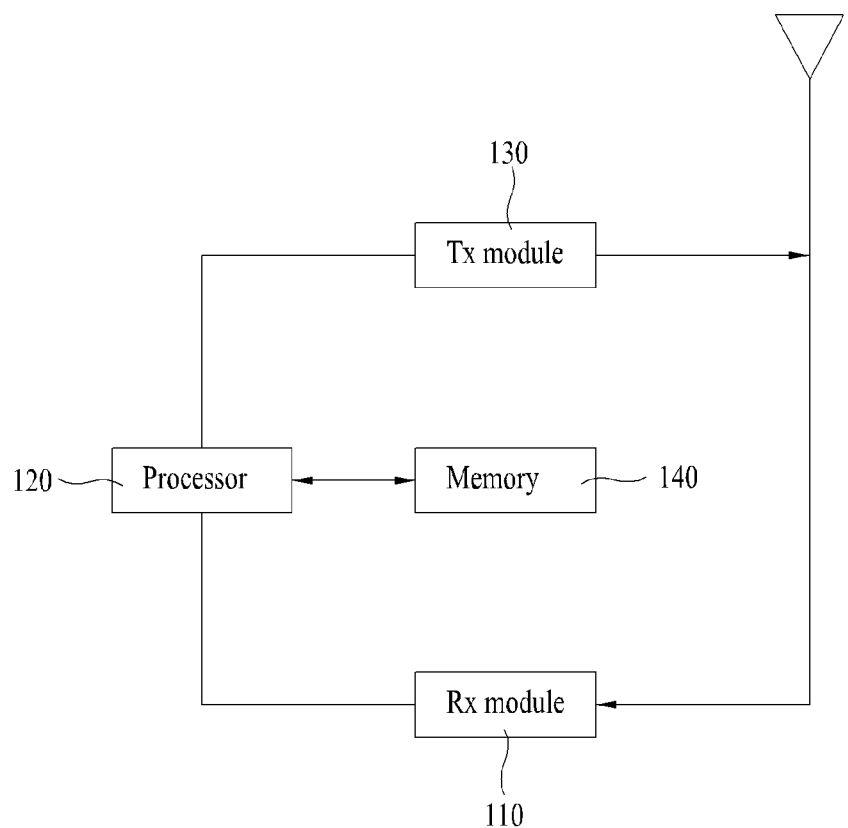
FIG. 12 is a view illustrating a structure of a wireless power transmission device in accordance with one embodiment of the present invention.

FIG. 12 is a view illustrating a structure of a wireless power transmission device in accordance with one embodiment of the present invention.

As shown in FIG. 12, the wireless power transmission device in accordance with the embodiment of the present invention may include a transmission module 130, a reception module 110, a processor 120 and a memory 140. In more detail, the processor 120 of the wireless power transmission device in accordance with this embodiment may determine one or more wireless power transmission devices which will transmit power transmission signals to a specific terminal between wireless power transmission devices, and match phase synchronization of the power transmission signals of the one or more wireless power transmission devices. Under control of such a processor 120, the transmission module 130 of the wireless power transmission device may transmit the power transmission signal of which the phase synchronization has been matched between the one or more wireless power transmission devices to the specific terminal.

The reception module 130 of the wireless power transmission device may receive a wireless power transmission request signal from a terminal, and store information required by the memory 140.

Wireless charging technology described in the above-described embodiments may be implemented as a combination of the respective embodiments. Further, when a plurality of nodes cooperatively transmits wireless power signals, a specific terminal receiving a data service may use a unit to inform a specific node of (a) power signal(s) of (a) node(s) having strong interference with the terminal to prevent interference. Further, although the above-described embodiments assume that nodes providing the wireless charging function also possess a data service providing capability and nodes not transmitting data transmit wireless power signals, the present invention does not exclude the possibility that specific nodes simultaneously transmit both data and wireless power signals.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Accordingly, the above-described embodiments are not to limit the present invention, but are to provide the broadest scope coinciding with the principles and novel characteristics disclosed herein.

INDUSTRIAL APPLICABILITY

The above-described cooperative wireless charging technology in accordance with the present invention provides both the conventional data communication function and a new wireless power charging function, and is thus applicable to various mobile devices and wireless nodes supporting the same.

The invention claimed is:

1. A wireless power transmission method in which power is wirelessly transmitted to terminals in a wireless communication system, the wireless power transmission method comprising:
    determining one or more nodes to transmit power transmission signals to a specific terminal, from among a plurality of nodes;
    matching phase synchronization of the power transmission signals between the one or more nodes with each other; and
    allowing the one or more nodes to transmit the power transmission signals of which the phase synchronization has been matched to the specific terminal,
    wherein the one or more nodes transmit the power transmission signals of which the phase synchronization has been matched for a period when the specific terminal is in an idle mode.

2. The wireless power transmission method according to claim 1, wherein the plurality of nodes includes one or more of access points (APs), Femto base stations (BSs), relay stations, wireless personal area networks (WPANs) and macro BSs to transmit the power transmission signals and data to the specific terminal.

3. The wireless power transmission method according to claim 1, further comprising allowing one or more nodes from among the plurality of nodes to receive a request signal requesting the power transmission signals from the specific terminal.

4. The wireless power transmission method according to claim 3, wherein the one or more nodes from among the plurality of nodes transmit the power transmission signals to the specific terminal according to priority of the request signal.

5. The wireless power transmission method according to claim 1, wherein the one or more nodes from among the plurality of nodes and the specific terminal exchange information regarding switching time of at least one mode from among a sleep mode, the idle mode and an active mode of the specific terminal.

6. The wireless power transmission method according to claim 1, wherein the wireless communication system executes communication using a frame structure including a first time section for transmission of the power transmission signals and a second time section for transmission of signals other than the power transmission signals.

7. The wireless power transmission method according to claim 6, wherein the second time section includes a time section for uplink signal reception and a time section for downlink signal transmission.

8. The wireless power transmission method according to claim 1, wherein the wireless communication system executes communication using a frame structure including a sub-band for transmission of the power transmission signals, from among a downlink bandwidth.

9. A wireless power transmission method in which terminals wirelessly receive power in a wireless communication system, the wireless power transmission method comprising:
    receiving power transmission signals of which the phase synchronization has been matched from one or more nodes determined from among a plurality of nodes; and
    executing wireless charging using the power transmission signals,
    wherein a specific terminal receives the power transmission signals of which the phase synchronization has been matched from the one or more nodes for a period when the specific terminal is in an idle mode.

10. The wireless power transmission method according to claim 9, wherein the plurality of nodes includes one or more of access points (APs), Femto base stations (BSs), relay stations, wireless personal area networks (WPANs) and macro BSs to transmit the power transmission signals and data to a specific terminal.

11. The wireless power transmission method according to claim 9, further comprising allowing a specific terminal to transmit a request signal requesting the power transmission signals to one or more nodes from among the plurality of nodes.

12. The wireless power transmission method according to claim 9, wherein the one or more nodes from among the plurality of nodes and the specific terminal exchange information regarding switching time of at least one mode from among a sleep mode, the idle mode and an active mode of the specific terminal.

13. The wireless power transmission method according to claim 9, wherein the wireless communication system executes communication using a frame structure including a first time section for transmission of the power transmission signals and a second time section for transmission of signals other than the power transmission signals.

14. The wireless power transmission method according to claim 13, wherein the second time section includes a time section for uplink signal transmission and a time section for downlink signal reception.

15. The wireless power transmission method according to claim 9, wherein the wireless communication system executes communication using a frame structure including a sub-band for transmission of the power transmission signals, from among a downlink bandwidth.

16. A wireless power transmission device which wirelessly transmits power to terminals in a wireless communication system, the wireless power transmission device comprising:
  a processor configured to determine one or more wireless power transmission devices to transmit power transmission signals to a specific terminal between wireless power transmission devices, and to match phase synchronization of the power transmission signals between the one or more wireless power transmission devices with each other; and
  a transmission module configured to transmit the power transmission signals of which the phase synchronization has been matched between the one or more wireless power transmission devices to the specific terminal,
  wherein the one or more wireless power transmission devices transmit the power transmission signals of which the phase synchronization has been matched for a period when the specific terminal is in an idle mode.

17. A terminal device which wirelessly receives power in a wireless communication system to execute charging, the terminal device comprising:
  a reception module configured to receive power transmission signals of which the phase synchronization has been matched from one or more nodes determined from among a plurality of nodes; and
  a charging module configured to execute wireless charging using the power transmission signals,
  wherein the reception module is further configured to receive the power transmission signals of which the phase synchronization has been matched from the one or more nodes for a period when a specific terminal is in an idle mode.

\* \* \* \* \*